United States Patent
Liu et al.

(10) Patent No.: US 11,574,092 B2
(45) Date of Patent: Feb. 7, 2023

(54) METHOD FOR FINE METAL MASK AND DESIGN DEVICE FOR THE SAME

(71) Applicant: BOE TECHNOLOGY GROUP CO., LTD., Beijing (CN)

(72) Inventors: Yue Liu, Beijing (CN); Shanshan Bai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 294 days.

(21) Appl. No.: 16/922,096

(22) Filed: Jul. 7, 2020

(65) Prior Publication Data
US 2021/0019459 A1    Jan. 21, 2021

(30) Foreign Application Priority Data
Jul. 15, 2019    (CN) .......................... 201910635256.2

(51) Int. Cl.
G06F 30/23     (2020.01)
G06F 30/17     (2020.01)
G06T 17/20     (2006.01)
G06F 111/04    (2020.01)

(52) U.S. Cl.
CPC .............. *G06F 30/23* (2020.01); *G06F 30/17* (2020.01); *G06T 17/205* (2013.01); *G06F 2111/04* (2020.01)

(58) Field of Classification Search
CPC ....................................................... G01N 3/08
See application file for complete search history.

(56) References Cited

U.S. PATENT DOCUMENTS

2016/0238499 A1*   8/2016   Ji ............................ G06F 30/23
2021/0118530 A1*   4/2021   Song ....................... G06F 30/23

* cited by examiner

*Primary Examiner* — Clifford Hilaire
(74) *Attorney, Agent, or Firm* — McDermott Will & Emery LLP (57) ABSTRACT

In one embodiment, the design method for a fine metal mask includes: establishing a three-dimensional simulation model of the fine metal mask according to design parameters of the fine metal mask; acquiring material property parameters of the fine metal mask; performing a simulation operation on the three-dimensional simulation model according to the material property parameters and simulation conditions, in order to obtain a simulation result of the fine metal mask after a mesh stretching, and the simulation conditions are configured to represent constraint conditions of the fine metal mask during the mesh stretching, and the simulation result comprises at least one of a deformation condition, a stress condition and a strain condition of the fine metal mask after the mesh stretching is performed; determining whether the simulation result matches a preset result; adjusting the design parameters according to the simulation result if no, and selecting the design parameters if yes.

16 Claims, 4 Drawing Sheets

METHOD FOR FINE METAL MASK AND DESIGN DEVICE FOR THE SAME

CROSS-REFERENCE TO RELATED APPLICATION

This application claims priority of Chinese Patent Application No. 201910635256.2 filed on Jul. 15, 2019 in China National Intellectual Property Administration, the disclosure of which is incorporated herein by reference in entirety.

TECHNICAL FIELD

The present disclosure relates to a field of the display technology, in particular to a design method for a fine metal mask and a design device for the same.

BACKGROUND

Organic light emitting diodes (OLED), also known as organic electro-laser displays and organic light-emitting semiconductors, have the characteristics of self-luminescence. Due to a high pixel density of the OLED display panel, when manufacturing an OLED display panel, a fine metal mask (FMM) with an ultra-thin thickness (such as 20-30 um), which is also known as a fine metal mask, is configured to vapor-deposit three-color (red green blue, RGB) organic light-emitting body in the OLED display panel.

Invar alloy (INVAR) with a small thermal expansion coefficient is usually configured to prepare FMM by chemical etching. After etching, the FMM also needs to be mesh stretched for evaporation. However, because the etched FMM becomes thin and brittle, and the surface morphology thereof varies, it is very easy to create wrinkles and bending during the actual mesh stretching process, and the FMM needs to be tightly adhered to the surface of the organic light-emitting substrate to be vapor-deposited during the evaporation process and needs to maintain a high position accuracy. At this time, the wrinkles and bending caused by the mesh stretching will create displacement of the vapor-deposited material and cause color mixing.

The wrinkles and bending of FMM are not only related to the mesh stretching, but also related to the design of the FMM. Because the manufacturing cost of the FMM is high, the cycle duration is long, and the processing is complicated, it is necessary for a designer to pre-judge occurrence of wrinkles and bending of the FMM at the time of the mesh stretching, so as to reduce the occurrence of wrinkles and bending. However, designers currently rely on their experience to predict the wrinkles and bending that may occur when the FMM is stretched. Unreliability is predicted by experience, so the error between the produced FMM and the expected result is large, and the yield is poor.

SUMMARY

According to a first aspect of the present disclosure, there is provided a design method for a fine metal mask, comprising:

establishing a three-dimensional simulation model of the fine metal mask according to design parameters of the fine metal mask;

acquiring material property parameters of the fine metal mask, wherein the material property parameters comprising at least one of elastic modulus, shear modulus and Poisson's ratio;

performing a simulation operation on the three-dimensional simulation model according to the material property parameters and simulation conditions, in order to obtain a simulation result of the fine metal mask after a mesh stretching, and the simulation conditions are configured to represent constraint conditions of the fine metal mask during the mesh stretching, and the simulation result comprises at least one of a deformation condition, a stress condition and a strain condition of the fine metal mask after the mesh stretching is performed; and determining whether the simulation result matches a preset result; adjusting the design parameters according to the simulation result if no, and selecting the design parameters if yes.

In some embodiments, the fine metal mask comprises a pixel area and a non-pixel area, and the design parameters comprises a first size of the pixel area and a second size of the non-pixel area;

the step of establishing a three-dimensional simulation model of the fine metal mask according to design parameters of the fine metal mask further comprises:

establishing a three-dimensional simulation model of a pixel unit structure according to the first size, wherein at least one of pixel unit structures constitutes the pixel area, and the pixel unit structure is a smallest anisotropic structure in the pixel area;

establishing a three-dimensional simulation model of the pixel area according to the three-dimensional simulation model of the pixel unit structure and a shell element modeling method;

establishing a three-dimensional simulation model of the non-pixel area according to the second size and the shell element modeling method; and combining the three-dimensional simulation model of the pixel area and the three-dimensional simulation model of the non-pixel area to obtain the three-dimensional simulation model of the fine metal mask.

In some embodiments, the step of acquiring material property parameters of the fine metal mask further comprises:

copying the three-dimensional simulation model of the pixel unit structure to obtain a pixel unit group structure with orthogonal anisotropy; and analyzing, by using a finite element analysis method, the pixel unit group structure to obtain the material property parameters.

In some embodiments, the simulation result comprises at least one of a displacement cloud diagram, a stress cloud diagram, and a strain cloud diagram;

the step of determining whether the simulation result matches the preset result further comprises:

obtaining a deformation condition of a preset path in the displacement cloud diagram;

determining whether the deformation condition matches a preset deformation condition in the preset result, wherein, determining that the simulation result matches the preset result if yes, and determining that the simulation result doesn't match the preset result if no.

In some embodiments, the simulation result comprises at least one of a displacement cloud diagram, a stress cloud diagram, and a strain cloud diagram;

the step of determining whether the simulation result matches the preset result further comprises:

obtaining a stress distribution of a preset path in the stress cloud diagram;

determining whether the stress distribution condition matches a preset stress distribution condition in the preset result, wherein, determining that the simulation result matches the preset result if yes, and determining that the simulation result doesn't match the preset result if no.

In some embodiments, the simulation result comprises at least one of a displacement cloud diagram, a stress cloud diagram, and a strain cloud diagram;

the step of determining whether the simulation result matches the preset result further comprises:

obtaining a strain distribution of a preset path in the strain cloud diagram;

determining whether the strain distribution condition matches a preset strain distribution condition in the preset result, wherein, determining that the simulation result matches the preset result if yes, and determining that the simulation result doesn't match the preset result if no.

In some embodiments, the step of adjusting the design parameters according to the simulation result comprises:

adjusting those of the design parameters corresponding to positions of openings of the non-pixel area of the fine metal mask and/or distribution density of the openings according to at least one of the deformation condition, the stress distribution condition and the strain distribution condition.

In some embodiments, a thickness of the three-dimensional simulation model of the fine metal mask is a product of an initial thickness of the fine metal mask and a preset coefficient; the design parameters comprise the initial thickness, and the preset coefficient is a constant.

According to a second aspect of the present disclosure, there is provided a design device for a fine metal mask, comprising:

an acquisition module configured to establish a three-dimensional simulation model of the fine metal mask according to design parameters of the fine metal mask, and obtain material property parameters of the fine metal mask, wherein the material property parameters comprises at least one of elasticity modulus, shear modulus and Poisson's ratio;

an operation module configured to perform a simulation operation on the three-dimensional simulation model according to the material property parameters and simulation conditions, in order to obtain a simulation result of the fine metal mask after a mesh stretching, and the simulation conditions are configured to represent constraint conditions of the fine metal mask during the mesh stretching, and the simulation result comprises at least one of a deformation condition, a stress condition and a strain condition of the fine metal mask after the mesh stretching is performed;

a determination module configured to determine whether the simulation result matches a preset result;

an adjustment module configured to adjust the design parameters according to the simulation result if no, and to select the design parameters if yes.

In some embodiments, the fine metal mask comprises a pixel area and a non-pixel area, and the design parameters comprise a first size of the pixel area and a second size of the non-pixel area, the acquisition module is further configured to:

establish a three-dimensional simulation model of a pixel unit structure according to the first size, wherein at least one of pixel unit structures constitutes the pixel area, and the pixel unit structure is a smallest anisotropic structure in the pixel area;

establish a three-dimensional simulation model of the pixel area according to the three-dimensional simulation model of the pixel unit structure and a shell element modeling method;

establish a three-dimensional simulation model of the non-pixel area according to the second size and the shell element modeling method; and combine the three-dimensional simulation model of the pixel area and the three-dimensional simulation model of the non-pixel area to obtain the three-dimensional simulation model of the fine metal mask.

In some embodiments, the acquisition module is further configured to:

copy the three-dimensional simulation model of the pixel unit structure to obtain a pixel unit group structure with orthogonal anisotropy; and analyze, by using a finite element analysis method, the pixel unit group structure to obtain the material property parameters.

In some embodiments, the simulation result comprises at least one of a displacement cloud diagram, a stress cloud diagram, and a strain cloud diagram, and the determination module is configured to:

obtain a deformation condition of a preset path in the displacement cloud diagram;

determine whether the deformation condition matches a preset deformation condition in the preset result, wherein, determining that the simulation result matches the preset result if yes, and determining that the simulation result doesn't match the preset result if no.

In some embodiments, the simulation result comprises at least one of a displacement cloud diagram, a stress cloud diagram, and a strain cloud diagram, and the determination module is configured to:

obtain a stress distribution of a preset path in the stress cloud diagram;

determine whether the stress distribution condition matches a preset stress distribution condition in the preset result, wherein, determining that the simulation result matches the preset result if yes, and determining that the simulation result doesn't match the preset result if no.

In some embodiments, the simulation result comprises at least one of a displacement cloud diagram, a stress cloud diagram, and a strain cloud diagram, and the determination module is configured to:

obtain a strain distribution of a preset path in the strain cloud diagram;

determine whether the strain distribution condition matches a preset strain distribution condition in the preset result, wherein, determining that the simulation result matches the preset result if yes, and determining that the simulation result doesn't match the preset result if no.

In some embodiments, the adjustment module is configured to:

adjust those of the design parameters corresponding to positions of openings of the non-pixel area of the fine metal mask and/or distribution density of the openings according to at least one of the deformation condition, the stress distribution condition and the strain distribution condition.

In some embodiments, a thickness of the three-dimensional simulation model of the fine metal mask is a product of an initial thickness of the fine metal mask and a preset coefficient; the design parameters comprise the initial thickness, and the preset coefficient is a constant.

According to a third aspect of the present disclosure, there is provided a design device for a fine metal mask, comprising:

at least one processor, and a memory connected to the at least one processor;

wherein, instructions executable by the at least one processor is stored in the memory, and the at least one processor implements the method of any one of the embodiments in the abovementioned first aspect by executing the instructions stored in the memory.

According to a third aspect of the present disclosure, there is provided a computer-readable storage medium, comprising:

computer instructions stored in the computer-readable storage medium, wherein the method of any one of the embodiments in the abovementioned first aspect is implemented when the computer instructions are executed by at least one processor of a computer device.

BRIEF DESCRIPTION OF THE DRAWINGS

FIG. 3b is a schematic structural sectional view taken along line AB in FIG. 3a;

DETAILED DESCRIPTION OF EMBODIMENTS

When preparing an OLED display panel, three primary colors need to be vapor-deposited into the OLED display panel through a vapor deposition process, and high temperature will be generated during the vapor deposition process, at this time the fine metal mask will be thermally expanded. As a result, the fine metal mask bending under the action of gravity, that is, the fine metal mask is deformed, so that the three primary colors cannot be evaporated to the desired positions.

In order to solve the problem of deformation of the fine metal mask caused by vapor deposition, the fine metal mask will be processed by a mesh stretching process before the vapor deposition, in which mesh stretching, four clamping areas of the metal mask are held by a mesh stretching machine, firstly, the fine metal mask is stretched, then a resistance is applied to the metal frame to deform the metal frame, and finally a laser is used to weld the stretched fine metal masks on the metal frame, the recovery force generated by the deformation of the metal frame is configured to tighten the fine metal mask at the welding places, so as to prevent the fine metal mask from bending during evaporation.

However, since the mesh stretching will cause the problem of wrinkling and bending of the fine metal mask, in order to solve the technical problem of large errors between the FMM designed by the designer based on experience and the expected result and low yield, the general idea of the technical solution in the embodiment of the present disclosure is expressed as follows:

there is provided a design method for a fine metal mask, including:

establishing a three-dimensional simulation model of the fine metal mask according to design parameters of the fine metal mask;

acquiring material property parameters of the fine metal mask, wherein the material property parameters comprising at least one of elastic modulus, shear modulus and Poisson's ratio;

performing a simulation operation on the three-dimensional simulation model according to the material property parameters and the simulation conditions, in order to obtain a simulation result of the fine metal mask after a mesh stretching, and simulation conditions are configured to represent constraint conditions of the fine metal mask during the mesh stretching, and the simulation result comprises at least one of a deformation condition, a stress condition and a strain condition of the fine metal mask after the mesh stretching is performed;

determining whether the simulation result matches a preset result; adjusting the design parameters according to the simulation result if no, and selecting the design parameter if yes.

In this embodiment, by establishing a three-dimensional simulation model of a fine metal mask, a simulation operation is performed on the three-dimensional simulation model according to the material property parameters and the simulation conditions. Compared with the designer's prediction of the tensile results of the stretched mesh based on experience, the simulation calculation is more accurate, and the obtained simulation results have a higher accuracy. The simulation results can more accurately reflect the deformation of the metal mask after the mesh stretching. Adjusting the design parameters according to the simulation results can help the designer to design and produce FMM, and, due to the high precision and accuracy of the simulation results, the designer can also find the FMM with design defects in time, improving the yield of the manufactured FMM, so as to solve the technical problem of a large error between the FMM produced by the designer and the expected results and a low yield rate, achieving a technical effect of improving the yield rate of FMM production and production and indirectly reducing costs due to the improved yield rate.

It should be noted that "at least one" in the practice of the present disclosure refers to one or more, and "multiple" refers to two or more. "and/or" describes the relationship of the related objects, indicating that there can be three relationships, for example, A and/or B, which can mean: A exists alone, A and B exist at the same time, B exists alone, where A, B can be singular or plural. The character "/" generally indicates that the related object is a "or" relationship. "At least one of the following" or similar expressions refers to any combination of these items, including any combination of single items or plural items. For example, at least one item (a) in a, b, or c can be expressed as: a, b, c, a and b, a and c, b and c, or a and b and c, where a, b, c can be single or multiple.

And, unless stated to the contrary, the embodiments of this application refer to ordinal numbers such as "first" and "second" to distinguish between multiple objects, and are not configured to limit the order, timing, priority, or importance.

The size and shape of each fine metal mask in the drawings do not reflect the true scale of the fine metal mask, and the purpose is only to schematically illustrate the present disclosure.

It should also be noted that the design method in the embodiments of the present disclosure is applied to a design device for fine metal masks with data processing capabilities such as mobile phones, computers, tablet computers, servers, cloud servers, etc. The design device provides three-dimensional modeling function and simulation operation function, in which, when building a 3D simulation model, you can use the user-designed program, existing Pro/ENGINEER, UG, CATIA and other 3D design software, or existing finite element analysis software such as ANSYS, Patran/Nastran, Abaqus, Hypermesh, etc., and the above-mentioned finite element analysis software, Matlab, user-designed programs, etc. can be used when performing simulation operations on the three-dimensional simulation model, which is not limited herein.

In order to better understand the above technical solutions, the above technical solutions will be described in detail in conjunction with the drawings and specific implementations of the specification. It should be understood that the embodiments of the present disclosure and the specific features in the embodiments are detailed for the technical solutions of the present disclosure The description, rather than the limitation on the technical solutions of the present disclosure, the embodiments of the present disclosure and the technical features in the embodiments can be combined with each other without conflict.

Figure 1:
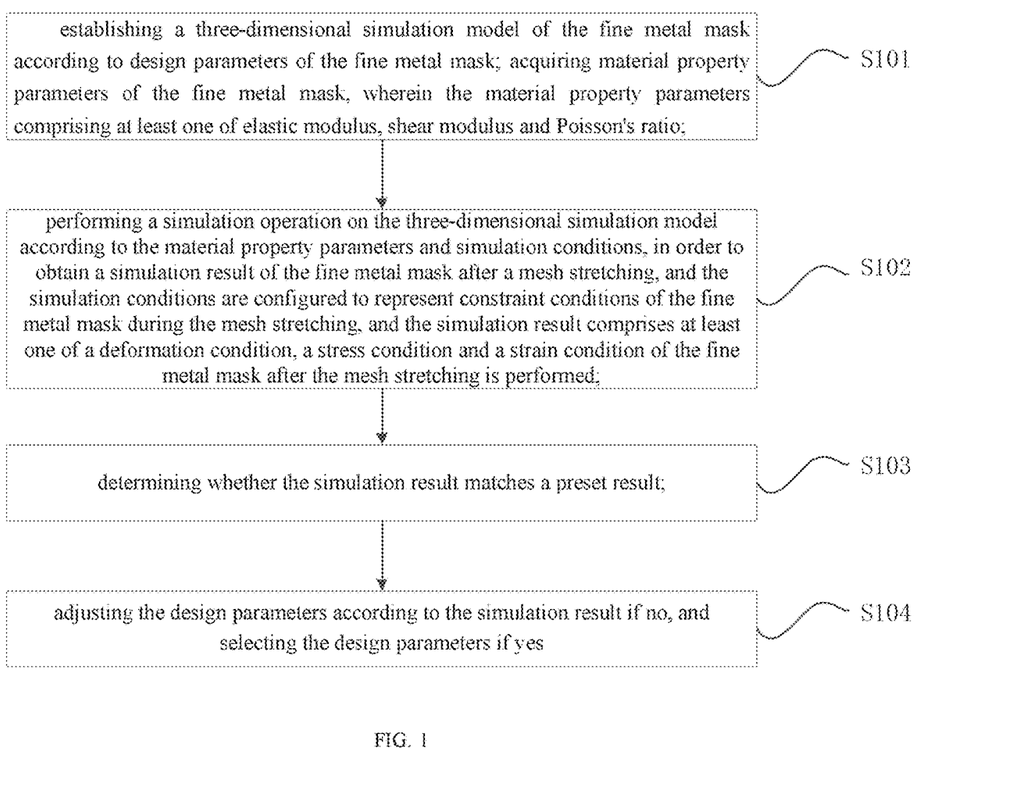
FIG. 1 is a flowchart of a design method for a fine metal mask provided by an embodiment of the present disclosure.

Referring to FIG. 1, an embodiment of the present disclosure provides a design method for a fine metal mask, including the following steps of:

S101. establishing a three-dimensional simulation model of the fine metal mask according to design parameters of the fine metal mask; acquiring material property parameters of the fine metal mask, wherein the material property parameters comprising at least one of elastic modulus, shear modulus and Poisson's ratio;

S102. performing a simulation operation on the three-dimensional simulation model according to the material property parameters and the simulation conditions, in order to obtain a simulation result of the fine metal mask after a mesh stretching, and simulation conditions are configured to represent constraint conditions of the fine metal mask during the mesh stretching, and the simulation result comprises at least one of a deformation condition, a stress condition and a strain condition of the fine metal mask after the mesh stretching is performed;

S103. determining whether the simulation result matches a preset result;

S104. adjusting the design parameters according to the simulation result if no, and selecting the design parameter if yes.

Figure 2:
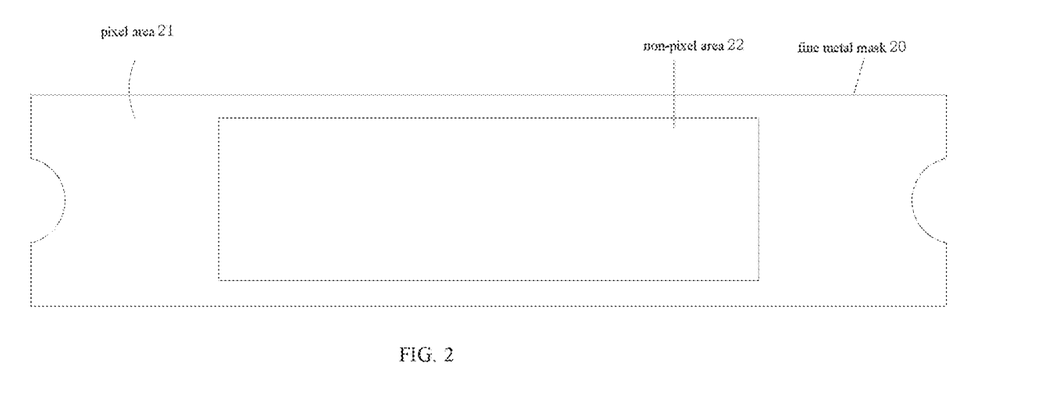
FIG. 2 is a schematic structural diagram of a fine metal mask provided by an embodiment of the present disclosure.
Figure 3A:
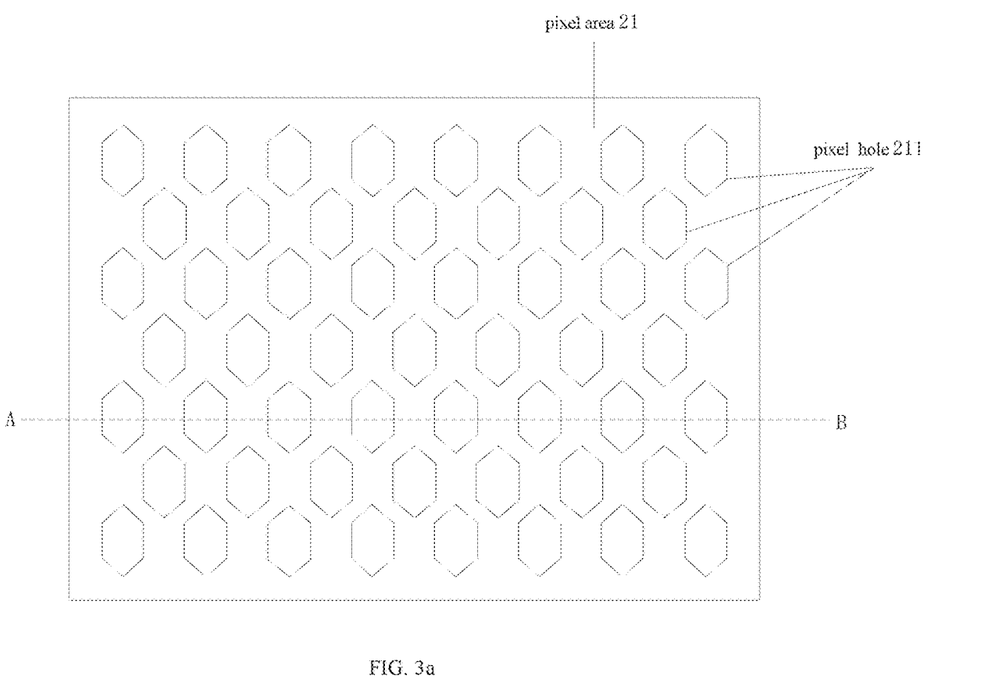
FIG. 3a is a schematic structural diagram of a pixel area in a fine metal mask provided by an embodiment of the present disclosure.
Figure 3B:
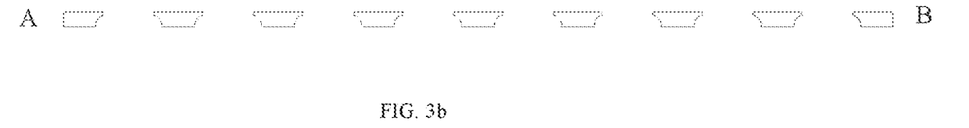

The fine metal masks in the embodiments of the present disclosure each include a pixel area and a non-pixel area. FIG. 2 exemplarily shows a structure of a fine metal mask 20. The fine metal mask 20 includes a pixel area 21 and a non-pixel area 22. As shown in FIG. 3*a*, the pixel area 21 includes a plurality of pixel holes 211. FIG. 3*b* exemplarily shows a cross-sectional view along the line AB of the pixel hole 211. The shape of the pixel hole 211 can refer to the shape in FIG. 3*a*. The pixel hole 211 is formed by etching the fine metal mask 20. The etching process may use the etching process in the related art, such as dry etching, wet etching, etc., which is not limited herein. The non-pixel area 22 may include a pixel hole or not include a pixel hole. When the fine metal mask 20 is stretched, the non-pixel area 22 is in contact with the metal frame.

First, step S101 is performed.

Figure 4A:
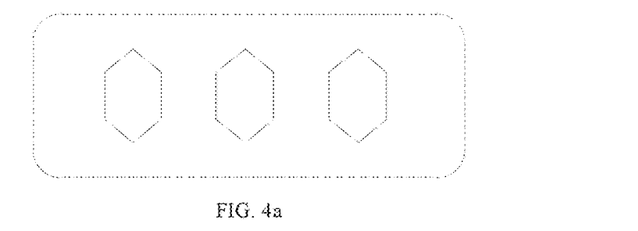
FIG. 4a is a schematic structural diagram of a surface structure of a fine metal mask provided by an embodiment of the present disclosure.
Figure 4B:
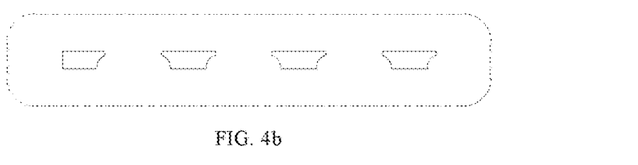
FIG. 4b is a schematic structural diagram of an internal structure of a fine metal mask provided by an embodiment of the present disclosure.

Specifically, the design parameter may be data expressed in the form of three-dimensional coordinates, or the design parameter may be, for example, two-dimensional graphic data of a plan view (as shown in FIG. 4*a*) that can represent the front structure of the pixel area of the fine metal mask, or a cross-sectional view (as shown in FIG. 4*b*) that can represent the internal structure of the fine metal mask. When the design parameters are input into the setting device of the fine metal mask, the design device can automatically establish a three-dimensional simulation model of the fine metal mask. The user can also manually create a three-dimensional simulation model of the fine metal mask. For example, the user manually draws the three-dimensional simulation model using the modeling function provided by the finite element analysis software.

Figure 5A:
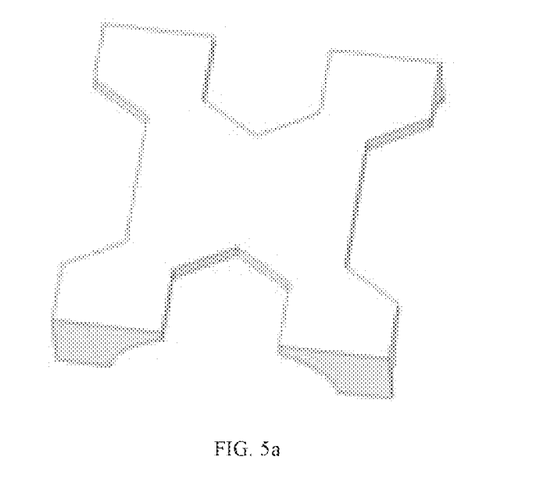
FIG. 5a is a schematic structural diagram of a pixel unit provided by an embodiment of the present disclosure.
Figure 5B:
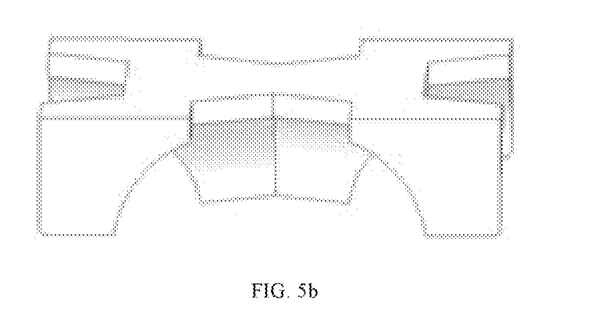
FIG. 5b is another schematic structural diagram of a pixel unit provided by an embodiment of the present disclosure.

The design parameters received by the design device may include a first size of the pixel area and a second size of the non-pixel area, the first size is the size of a pixel unit structure constituting the pixel area, and the pixel unit structure is the minimum anisotropic structure in that the pixel area, for example, the first size is the size of the pixel opening (also called pixel hole) in the pixel area and the distance between the pixel openings, so that a three-dimensional simulation model of the pixel unit structure can be established according to the first size. The pixel area is composed of at least one pixel unit structure. For the pixel unit structure, please refer to FIGS. 5*a* and 5*b*. FIG. 5*a* shows the shape of the front side of a possible pixel unit structure, and FIG. 5*b* shows the side shape of the pixel unit structure. The pixel unit structures in FIG. 5*a* have four incomplete openings, and every two pixel unit structures can be combined to form a complete pixel opening. The pixel unit structure is formed by punching and etching. The four half hexagons in front of the pixel unit structure are obtained by punching, and the circular arc shape visible on the side of the pixel unit structure in FIG. 5*b* is obtained by etching.

It should be noted that the morphological characteristics of the pixel unit structure are related to the etching process, that is, different etching processes will result in different pixel openings. For a same etching process, the morphological characteristics of the pixel openings in a produced fine metal mask are basically the same.

After obtaining the three-dimensional simulation model of the pixel unit structure, the three-dimensional simulation model of the pixel area can be established through the shell element modeling method according to the three-dimensional simulation model of the pixel unit structure. Specifically, the number and arrangement of the pixel unit structures included in the pixel area needs to be determined here, for example, the pixel area includes 1294 pixel unit structures, the arrangement is 7 rows, and the odd rows include 100 pixel unit structures and the even rows include 99 pixel unit structures. The line spacing is 50 um, and the adjacent pixel unit structure spacing in each line is 90 um. The number and arrangement of the above pixel unit structures may be included in the design parameters, and the default value of the design device may be used.

Since the non-pixel area may include a pixel hole, when the non-pixel area does not include a pixel hole, the non-pixel area is a solid flat plate, and the second size is the size of the flat plate. At this time, a three-dimensional simulation model of the non-pixel area is able to be established according to according to the second size and the shell element modeling method. If the non-pixel area includes pixel holes, the second size also includes the size of the pixel unit structure in the non-pixel area. The pixel unit structure in the non-pixel area may be the same as or different from the pixel unit structure in the pixel area. The three-dimensional simulation model of the area also needs to determine the number and arrangement of the pixel unit structures included in the non-pixel area. The specific determination method and the method of establishing the three-dimensional simulation model of the non-pixel area are similar to the above method of creating the three-dimensional simulation model of the pixel area, which will not be repeated here.

It should be noted here that the fine metal mask in the embodiment of the present disclosure may be an ultra-thin mask, whose thickness is much smaller than the dimensions in other directions, for example, the ratio of the length and thickness of the fine metal mask is greater than 20000. For this ultra-thin mask, the plane stress state can be analyzed. The plane stress only needs to consider the stress parallel to this plane, and does not need to consider the stress perpendicular to the plane, that is, the stress perpendicular to the plane is considered to be small to be negligible. Therefore, in order to speed up the calculation speed during the simulation, the fine metal mask in the embodiment of the present disclosure can use the shell element modeling method to simulate the actual structure. The characteristics of the shell element modeling method are: if the size of the structure in one direction is much smaller than the dimensions in other directions, the stress in this direction can be ignored.

After acquiring the three-dimensional simulation model of the pixel area and the non-pixel area, the three-dimensional simulation model of the fine metal mask can be obtained by combining the three-dimensional simulation model of the pixel area and the three-dimensional simulation model of the non-pixel area. It should be noted that the size of the obtained three-dimensional simulation model of the fine metal mask is the same as the size of the fine metal mask in actual production. The length, width and thickness of the three-dimensional simulation model and the actual fine metal mask here are both the same (that is, the length, width and thickness are all obtained by proportional modeling), but the details are different. That is, the pixel opening of the pixel area is replaced by a solid area without openings in the 3D simulation model. In the shell element modeling mode, the three-dimensional simulation model belongs to the shell element model.

Further, the obtained three-dimensional simulation model of the fine metal mask has an initial thickness, which is included in the design parameters. Due to the calculation time of the simulation program and the limitation of computer configuration, the FMM simulation model uses a solid model instead of a pixel opening in the original model, so the result of the simulation using the initial thickness may not be the optimal value. The thickness of the three-dimensional simulation model of the fine metal mask can be optimized using a preset coefficient. The specific optimization method is to optimize the thickness of the three-dimensional simulation model of the fine metal mask to the product of the initial thickness and the preset coefficient which is a constant. Among them, after a large number of experiments, the optimization effect is the best when the preset coefficient is 86%-87%. For example, if the initial thickness is 30 um and the preset coefficient is 86.5%, the thickness of the optimized fine metal mask is 26 um.

When step S101 is performed, the material property parameters of the fine metal mask can also be obtained, and the following method steps can be used specifically:

copying the three-dimensional simulation model of the pixel unit structure to obtain a pixel unit group structure with orthogonal anisotropy; and analyzing, by using a finite element analysis method, the pixel unit group structure to obtain the material property parameters.

Taking the design device using the finite element simulation software ANSYS to obtain material property parameters as an example, the symmetrical copy function in ANSYS is configured to copy the three-dimensional simulation model of the pixel unit structure. The copied pixel unit structure model and the original pixel unit structure model are plane symmetric about the plane with the largest area of the model, and the pixel unit group structure is obtained. Then, the simulation function in ANSYS is configured to analyze the pixel unit group structure to obtain material property parameters.

It should be noted here that the anisotropy in the embodiments of the present disclosure is that all or part of the physical properties of a substance change with the change of the direction, and show different properties in different directions.

Specifically, due to the anisotropy of the pixel unit structure, it is very complicated to analyze the anisotropic model by using the finite element method. It is necessary to divide the model into a large number of isotropic small blocks and then analyze it, which will cause calculations. The amount is too large and the analysis speed is slow. In the embodiment of the present disclosure, the pixel unit structure is first copied to obtain an orthogonally anisotropic pixel unit group structure, and then the pixel unit group structure is analyzed by the finite element method to obtain material property parameters. It should be noted that the general anisotropic material consists of 36 elastic constants and only 21 independent elastic constants, while the orthogonal anisotropic material has only 9 independent elastic constants. The following formula gives the relationship between stress and strain expressed in matrix form of orthotropic materials:

$$\begin{bmatrix} \sigma_1 \\ \sigma_2 \\ \sigma_3 \\ \tau_{23} \\ \tau_{31} \\ \tau_{12} \end{bmatrix} = \begin{bmatrix} C_{11} & C_{12} & C_{13} & 0 & 0 & 0 \\ C_{21} & C_{22} & C_{23} & 0 & 0 & 0 \\ C_{31} & C_{32} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix} * \begin{bmatrix} \varepsilon_1 \\ \varepsilon_2 \\ \varepsilon_3 \\ \gamma_{23} \\ \gamma_{31} \\ \gamma_{12} \end{bmatrix} \quad \text{Formula (1)}$$

The material is three-dimensional, so that the x-axis, y-axis and z-axis in the Cartesian coordinate system can be configured to indicate the direction of stress and strain, where i=1, 2, 3, j=1, 2, 3, a value of 1 on i or j indicates a square on the x axis, a value of 2 on i or j indicates a square on the y axis, a value of 3 on i or j indicates the positive direction of the z axis, $\sigma_i$ is the normal stress along the positive direction of the coordinate axis, and $\tau_{ij}$ is shear stress in the ij plane, of which the direction is along the positive direction of the j-axis, $\varepsilon_i$ is the normal strain along the positive direction of the coordinate axis, $\gamma_{ij}$ is the shear strain in the ij plane, of which the direction is along the positive direction of the j-axis, and $C_{ij}$ is the stiffness coefficient.

In the embodiments of the present disclosure, the material property parameters include at least one of elastic modulus, shear modulus, and Poisson's ratio. Elastic 3 modulus E (elastic modulus, EM), also known as Young's modulus (Young's modulus), is that when a material in the stage of elastic deformation, its stress become a proportional relationship with the strain, the proportional coefficient is the elastic modulus, the unit is Dyne per square centimeter. Shear modulus G (modulus of rigidity), also known as shear modulus or rigid modulus, is the ratio of shear stress to shear strain in the stage of elastic deformation of a material and is configured to indicate the difficulty of shear deformation of the material. Poisson's ratio v is the ratio of the absolute value of the transverse normal strain to the axial normal strain when the material is unidirectionally tensioned or compressed, and it is also called the transverse deformation coefficient and is the elastic constant configured to reflect the lateral deformation of the material.

An orthotropic material property parameter can be used to represent the aforementioned relationship between stress and strain by Formula (2), as follows:

$$\begin{bmatrix} \varepsilon_1 \\ \varepsilon_2 \\ \varepsilon_3 \\ \gamma_{23} \\ \gamma_{31} \\ \gamma_{12} \end{bmatrix} = \begin{bmatrix} \frac{1}{E_1} & -\frac{v_{21}}{E_2} & -\frac{v_{31}}{E_3} & 0 & 0 & 0 \\ -\frac{v_{12}}{E_1} & \frac{1}{E_2} & -\frac{v_{32}}{E_3} & 0 & 0 & 0 \\ -\frac{v_{13}}{E_1} & -\frac{v_{23}}{E_2} & \frac{1}{E_3} & 0 & 0 & 0 \\ 0 & 0 & 0 & \frac{1}{G_{23}} & 0 & 0 \\ 0 & 0 & 0 & 0 & \frac{1}{G_{31}} & 0 \\ 0 & 0 & 0 & 0 & 0 & \frac{1}{G_{12}} \end{bmatrix} * \begin{bmatrix} \sigma_1 \\ \sigma_2 \\ \sigma_3 \\ \tau_{23} \\ \tau_{31} \\ \tau_{12} \end{bmatrix} \quad \text{Formula (2)}$$

That is to say, the stiffness coefficient can be expressed by the material property parameter in this embodiment, so that the material property parameter can be obtained according to the above formula.

In addition to using the method in this embodiment to obtain material property parameters, methods in related art may also be configured to obtain material property parameters, which will not be described here.

After step S101 is performed, step S102 is performed, that is, a simulation operation is performed on the three-dimensional simulation model according to the material property parameters and the simulation conditions to obtain a mesh stretched on the fine metal mask simulation results, the simulation conditions are configured to indicate the force of the fine metal mask when the mesh is stretched, the simulation results include the deformation of the fine metal mask after the mesh stretch, at least one of the stress condition and strain condition.

Specifically, the simulation condition is configured to express the force of the fine metal mask when the sheet is stretched. For example, the simulation conditions are the actual constraints of the fine metal mask in the actual meshing process, including the gravity of the fine metal mask, the horizontal tension and fineness of the fine metal mask, and displacement of metal mask etc. when the mesh stretching is performed. When performing step S102, the simulation conditions need to be obtained, and the acquisition method includes the simulation conditions input by the user, the simulation conditions recommended by the simulation software, etc. Regardless of which acquisition method is adopted, the simulation conditions need to be in principle the same as the subsequent mesh stretching process, to ensure the accuracy of the simulation results.

It should be noted that when performing a simulation operation on the three-dimensional simulation model, the finite element analysis method, the material point method, the smooth particle hydrodynamics method, the geometric analysis method such as geometric analysis method, etc. may be used, which is not limited herein. For example, the finite element analysis method is configured to solve the three-dimensional simulation model of the fine metal mask based on the obtained material property parameters to obtain the simulation results. The simulation result obtained by performing step S102 includes at least one of the deformation condition, the stress condition, and the strain condition of the fine metal mask after the mesh stretching, wherein the deformation condition includes bending and wrinkling.

After step S102 is executed, step S103 is executed, that is, determining whether the simulation result matches a preset result. The preset result can indicate the ideal state that the fine metal mask does not have a wrinkle or has a small bending (for example Bending≤100 um) after the mesh stretching, and determining whether the simulation result matches the preset result is to determine whether the simulation result, compared with the deformation result of the preset result, is within the allowable error range. For example, the allowable error range is 3%, and the error of the deformation of the simulation result is only 2% compared to the deformation of the preset result, then it is determined that the simulation result matches the preset result. If the error between the deformation of the simulation result and the deformation of the preset result is 5%, and it is determined that the simulation result does not match the preset result.

The simulation result includes at least one of a displacement cloud diagram, a stress cloud diagram, and a strain cloud diagram. To determine whether the simulation result matches the preset result, the following methods can be used:

obtaining a deformation condition of a preset path in the displacement cloud diagram; and determining whether the deformation condition matches a preset deformation condition in the preset result, wherein, determining that the simulation result matches the preset result if yes, and determining that the simulation result doesn't match the preset result if no; and/or, obtaining a stress distribution of the preset path in the stress cloud diagram; determining whether the stress distribution condition matches the preset stress distribution condition in the preset result, where, determining that the simulation result matches the preset result if yes, and determining that the simulation result doesn't match the preset result if no; and/or, obtaining a strain distribution of a preset path in the strain cloud diagram; determining whether the strain distribution condition matches a preset strain distribution condition in the preset result, wherein, determining that the simulation result matches the preset result if yes, and determining that the simulation result doesn't match the preset result if no.

TABLE 1

| simulation result | whether the deformation condition matches | whether the stress distribution condition matches | whether the strain distribution condition matches | whether the simulation result matches |
|---|---|---|---|---|
| displacement cloud diagram | yes | none | none | match |
|  | no |  |  | not match |
| stress cloud diagram | none | yes | none | match |
|  |  | no |  | not match |
| strain cloud diagram | none | none | yes | match |
|  |  |  | no | not match |
| displacement cloud diagram and stress cloud diagram | yes | yes | none | match |
|  | yes | no |  | not match |
|  | no | yes |  | not match |
|  | no | no |  | not match |
| displacement cloud diagram and strain cloud diagram | yes | none | yes | match |
|  | yes |  | no | not match |
|  | no |  | yes | not match |
|  | no |  | no | not match |
| stress cloud diagram, and strain cloud diagram | none | yes | yes | match |
|  |  | yes | no | not match |
|  |  | no | yes | not match |
|  |  | no | no | not match |
| displacement cloud diagram, stress cloud diagram, and strain cloud diagram | yes | yes | yes | match |
|  | yes | yes | no | not match |
|  | yes | no | yes | not match |
|  | no | yes | yes | not match |
|  | yes | no | no | not match |
|  | no | yes | no | not match |
|  | no | no | yes | not match |
|  | no | no | no | not match |

Table 1 shows all possible conditions for determining whether the simulation result matches the preset result with the difference of the simulation result. In short, the simulation result includes the strain cloud diagram, the displacement cloud diagram and the stress cloud diagram. In all cases, as long as any one of the conditions (referring to deformation, stress distribution, or strain distribution) does not match, the simulation results will not match. Only when the conditions included in the simulation results all match, the simulation results will match. For example, if the simulation result includes a stress cloud diagram and a displacement cloud diagram, the simulation result matches the preset result only when the stress distribution condition matches the preset stress distribution condition and the deformation condition matches the preset deformation condition.

Figure 6:
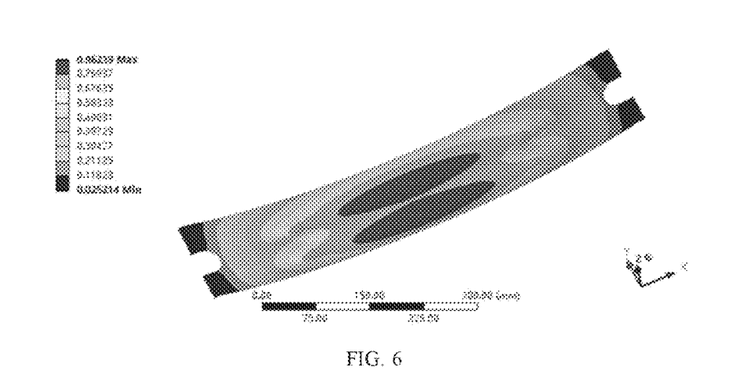
FIG. 6 is a schematic diagram when the simulation result is a displacement cloud in the design method of a fine metal mask provided by an embodiment of the present disclosure.

The preset path is a path preset by the user or a default path of the design device, and the path is a line segment set by the user. The simulation result given in FIG. 6 is a displacement cloud image, where different gray levels in the displacement cloud image indicate different heights, as shown by the gray bars, when no constraints are applied, the fine metal mask is parallel to the xy plane After the solution, under the action of gravity pull, the fine metal mask is displaced, and its height can be expressed by the value of the z-axis direction, so that each point in the upper surface of the fine metal mask does not have wrinkle and bending. The height values are all 0 (that is, the state before the constraint is applied). When the fine metal mask is deformed, its surface will show wrinkles and bending trends, and different heights will show different deformation conditions. For example, the preset path is the central axis of the fine metal mask (X direction and Y direction), so that the deformation of the fine metal mask is wrinkle (Y direction central axis) and bending (X direction central axis), Moreover, the wrinkle situation at the central axis position in the Y direction is the most serious, and the severity of the wrinkle situation decreases toward both sides along the X direction.

Taking the displacement cloud diagram in FIG. 6 as an example, the deformation of this path on the X axis of the pixel area is taken. The preset result is the displacement difference (Zmax.−Zmin.) of all points on the path in the Z axis direction. The maximum is 100 um, that is, Bending ≲ 100 um, if the displacement difference of the point on the path taken by the fine metal mask in the Z-axis direction is 120 um, that is, the Bending error is 20%, which is much greater than the allowable deformation error range, so that the simulation result does not match the preset result.

If it is determined that the simulation results match the preset results, the production can be performed according to the three-dimensional simulation model of the fine metal mask, but it should be noted here that the production needs to be produced according to the initial thickness of the three-dimensional simulation model, instead of according to the optimized thickness.

After step S103 is executed, step S104 is executed, that is, if no, the design parameters are adjusted according to the simulation result to achieve the purpose of optimizing the design, and, the design parameters are determined if yes.

Specifically, because the pixel area in the fine metal mask is closely related to the subsequent evaporation to be designed, generally, the design parameters corresponding to the pixel area are not adjusted, and the design parameters corresponding to the non-pixel area are adjusted when step S104 is performed. Specifically those of the design parameters corresponding to the location of the openings and/or the distribution density of the openings of the non-pixel area of the fine metal mask are adjusted according to at least one of the deformation condition, the stress distribution condition and the strain distribution condition. It should be noted that the opening of the non-pixel area is substantially the same as or similar to the structure of the pixel hole of the pixel area, and for ease of distinction, it is referred to herein as an opening.

For example, if the deformation indicates that the fine metal mask bending, you can move the opening of the non-pixel area along the line horizontally, or reduce the number of openings in the non-pixel area along the line horizontally. Or, the opening of the non-pixel area along the line horizontally at the position where the bending occurs will be reduced and the number of openings at the non-pixel area along the line horizontally will be reduced.

In another example, the deformation indicates that the fine metal mask is wrinkled, and the number of openings in the non-pixel area along the line horizontally where the wrinkle occurs can be increased.

For another example, the deformation indicates that the fine metal mask bends and wrinkles, it can move the opening position of the non-pixel area along the horizontal line of the bending position to the horizontal line of the wrinkling position, or reduce the number of openings in the non-pixel area along the horizontal line wherein the bending position appears, and increase the number of openings in the non-pixel area along the horizontal line where wrinkles appear.

Figure 7:
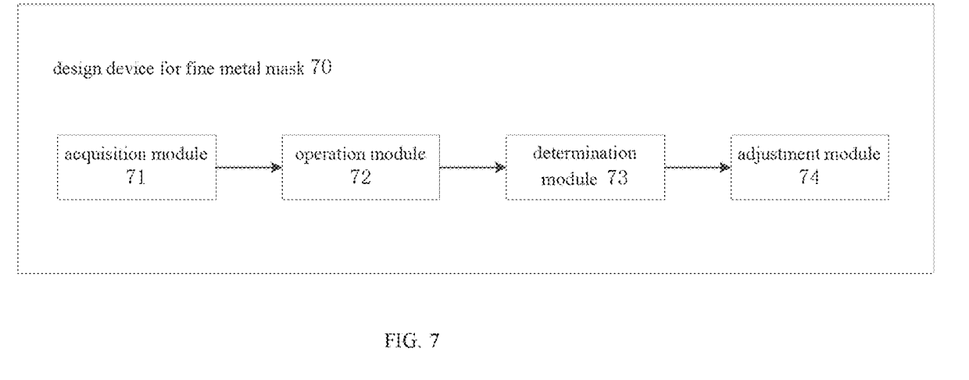
FIG. 7 is a schematic diagram of a design device for a fine metal mask provided by an embodiment of the present disclosure.

Referring to FIG. 7, based on one same inventive concept, an embodiment of the present disclosure also provides a design device 70 for a fine metal mask, including:

an acquisition module 71 configured to establish a three-dimensional simulation model of the fine metal mask according to the design parameters of the fine metal mask, and obtain material property parameters of the fine metal mask, the material property parameters including at least one of elastic modulus, shear modulus and Poisson's ratio;

an operation module 72 configured to perform simulation operation on the three-dimensional simulation model according to the material property parameters and simulation conditions to obtain a simulation result after the mesh stretching of the fine metal mask, the simulation conditions. It is configured to express the force of the fine metal mask when the mesh stretching is performed. The simulation results include at least one of the deformation, stress and strain of the fine metal mask after the mesh is stretched;

a determination module 73 configured to determine whether the simulation result matches the preset result; and an adjustment module 74 configured to adjust the design parameter according to the simulation result if no, and select the design parameter if yes.

In some embodiments, the fine metal mask includes a pixel area and a non-pixel area, the design parameters include a first size of the pixel area and a second size of the non-pixel area, and the acquisition module is specifically configured to:

establish a three-dimensional simulation model of a pixel unit structure according to the first size, the at least one of the pixel unit structures constitutes the pixel area, and the pixel unit structure is the smallest anisotropic structure in the pixel area;

establish a three-dimensional simulation model of the pixel area according to the three-dimensional simulation model of the pixel unit structure and the shell element modeling method;

establish a three-dimensional simulation model of the non-pixel area according to the second size and the shell element modeling method;

combine the three-dimensional simulation model of the pixel area and the three-dimensional simulation model of the non-pixel area to obtain the three-dimensional simulation model of the fine metal mask.

In some embodiments, the acquisition module is also configured to:

copy the three-dimensional simulation model of the pixel unit structure to obtain a pixel unit group structure with orthogonal anisotropy;

a finite element analysis method is configured to analyze the pixel unit group structure to obtain the material property parameters.

In some embodiments, the simulation result includes at least one of a displacement cloud diagram, a stress cloud diagram, and a strain cloud diagram, and the determination module is configured to:

acquire the deformation condition of the preset path in the displacement cloud; determine whether the deformation condition matches the preset deformation condition in the preset result, where it is determined that the simulation result matches the preset result if yes, it is determined that the simulation result does not match the preset result if no; and/or, acquire the stress distribution of the preset path in the stress cloud diagram; determine whether the stress distribution matches the preset stress distribution in the preset result, where it is determined that the simulation result matches the preset result if yes, it is determined that the simulation result does not match the preset result if no; and/or, acquire the strain distribution of the preset path in the strain cloud diagram; determine whether the strain distribution matches the preset strain distribution in the preset result, where it is determined that the simulation result matches the preset result if yes, it is determined that the simulation result does not match the preset result if no.

In some embodiments, the adjustment module is configured to:

adjusting those of the design parameters corresponding to the position and/or the distribution density of the opening of the non-pixel area of the fine metal mask according to at least one of the deformation conditions, the stress distribution condition and the strain distribution condition.

In some embodiments, the thickness of the three-dimensional simulation model of the fine metal mask is the product of the initial thickness of the fine metal mask and a preset coefficient. The design parameters include the initial thickness and the preset coefficient is a constant.

Figure 8:
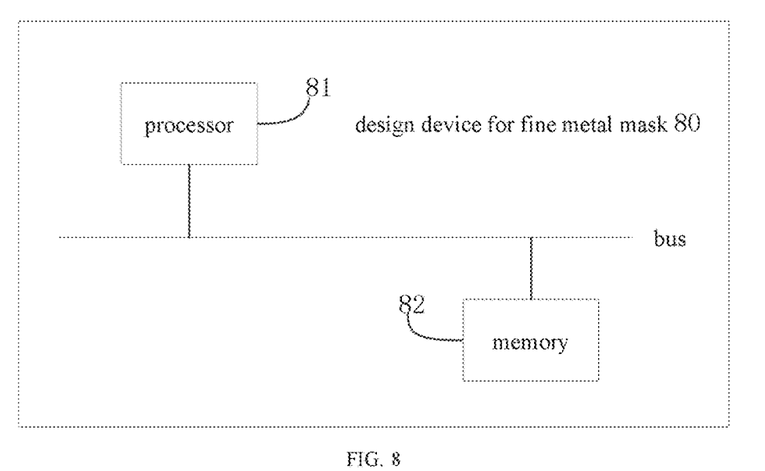
FIG. 8 is a schematic diagram of the physical structure of a design device for a fine metal mask provided by an embodiment of the present disclosure.

Referring to FIG. 8, based on the same inventive concept, an embodiment of the present disclosure also provides a design device 80 for a fine metal mask, including:

at least one processor 81, and a memory 82 connected to the at least one processor 81.

The memory 82 stores therein instructions executable by the at least one processor 81, and the at least one processor 81 implements the steps of the method as described in the above method embodiments by executing the instructions stored by the memory 82.

In some embodiments, the processor 81 may specifically include a central processing unit (CPU), an application specific integrated circuit (ASIC), and may be one or more integrated circuits for controlling program execution. It can be a hardware circuit developed using a field programmable gate array (FPGA), or it can be a baseband processor.

In some embodiments, the processor 81 may include at least one processing core.

In some embodiments, the device further includes a memory 82, and the memory 82 may include a read only memory (read only memory, ROM), a random access memory (random access memory, RAM), and a magnetic disk memory. The memory 82 is configured to store data required by the processor 81 during operation.

Based on one same inventive concept, an embodiment of the present disclosure also provides a computer-readable storage medium, including:

computer instructions are stored in the computer-readable storage medium, and when the computer instructions are executed by at least one processor of the computer device, the method as described in the foregoing method embodiments is implemented.

The above technical solutions in the embodiments of the present disclosure have at least the following technical effects or advantages.

In the embodiment of the present disclosure, by establishing a three-dimensional simulation model of a fine metal mask, the three-dimensional simulation model is simulated according to the simulation conditions and material property parameters. Compared with the designer's prediction of the tensile mesh stretching results based on experience, the simulation operation is more accurate, resulting in a higher accuracy of the simulation results. The simulation results can more accurately reflect the deformation of the metal mask after the mesh stretching. Adjusting the design parameters according to the simulation results can help the designer to design and produce FMM, and due to the high accuracy of the simulation results, designers can also find FMM with design defects in time, improving the yield of the produced FMM, in order to solve the technical problem of a large error between the FMM designed by the designer based on experience and the expected results and a low yield rate, to achieve a technical effect of improving the yield rate of FMM production and reducing costs.

Although the preferred embodiments of the present disclosure have been described, those skilled in the art can make additional changes and modifications to these embodiments once they learn the basic inventive concept. Therefore, the appended claims are intended to be interpreted as including the preferred embodiments and all changes and modifications falling within the scope of the present disclosure.

Those skilled in the art should understand that the embodiments of the present application may be provided as methods, systems, or computer program products. Therefore, the present application may take the form of an entirely hardware embodiment, an entirely software embodiment, or an embodiment combining software and hardware. Furthermore, the present application may take the form of a computer program product implemented on one or more computer usable storage media (including but not limited to disk storage and optical storage, etc.) containing computer usable program code.

This application is described with reference to flowcharts and/or block diagrams of methods, devices (systems), and computer program products according to embodiments of the application. It should be understood that each flow and/or block in the flowchart and/or block diagram and a combination of the flow and/or block in the flowchart and/or block diagram can be implemented by computer program instructions. These computer program instructions can be provided to the processor of a general-purpose computer, special-purpose computer, embedded processing machine, or other programmable data processing device to produce a machine that enables the generation of instructions executed by the processor of the computer or other programmable data processing device. A device for realizing the functions specified in one block or multiple blocks of one flow or multiple flows of a flowchart and/or one block or multiple blocks of a block diagram.

These computer program instructions may also be stored in a computer readable memory that can guide a computer or other programmable data processing device to work in a specific manner, so that the instructions stored in the computer readable memory produce an article of manufacture including an instruction device, the instructions The device implements the functions specified in one block or multiple blocks in the flowchart one flow or multiple flows and/or block diagrams.

These computer program instructions can also be loaded onto a computer or other programmable data processing device, so that a series of operating steps are performed on the computer or other programmable device to produce computer-implemented processing, which is executed on the computer or other programmable device. The instructions provide steps for implementing the functions specified in one block or multiple blocks of the flowchart one flow or multiple flows and/or block diagrams.

Obviously, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. A design method for a fine metal mask, comprising:
   establishing a three-dimensional simulation model of the fine metal mask according to design parameters of the fine metal mask;
   acquiring material property parameters of the fine metal mask, wherein the material property parameters comprising at least one of elastic modulus, shear modulus and Poisson's ratio;
   performing a simulation operation on the three-dimensional simulation model according to the material property parameters and simulation conditions, in order to obtain a simulation result of the fine metal mask after a mesh stretching, and the simulation conditions are configured to represent constraint conditions of the fine metal mask during the mesh stretching, and the simulation result comprises at least one of a deformation condition, a stress condition and a strain condition of the fine metal mask after the mesh stretching is performed; and
   determining whether the simulation result matches a preset result; adjusting the design parameters according to the simulation result if no, and selecting the design parameters if yes,
   wherein the fine metal mask comprises a pixel area and a non-pixel area, and the design parameters comprise a first size of the pixel area and a second size of the non-pixel area;
   the step of establishing a three-dimensional simulation model of the fine metal mask according to design parameters of the fine metal mask further comprises:
   establishing a three-dimensional simulation model of a pixel unit structure according to the first size, wherein at least one of pixel unit structures constitutes the pixel area, and the pixel unit structure is a smallest anisotropic structure in the pixel area;
   establishing a three-dimensional simulation model of the pixel area according to the three-dimensional simulation model of the pixel unit structure and a shell element modeling method;
   establishing a three-dimensional simulation model of the non-pixel area according to the second size and the shell element modeling method; and
   combining the three-dimensional simulation model of the pixel area and the three-dimensional simulation model of the non-pixel area to obtain the three-dimensional simulation model of the fine metal mask.

2. The method of claim 1, wherein the step of acquiring material property parameters of the fine metal mask further comprises:
   copying the three-dimensional simulation model of the pixel unit structure to obtain a pixel unit group structure with orthogonal anisotropy; and
   analyzing, by using a finite element analysis method, the pixel unit group structure to obtain the material property parameters.

3. The method of claim 1, wherein the simulation result comprises at least one of a displacement cloud diagram, a stress cloud diagram, and a strain cloud diagram;
   the step of determining whether the simulation result matches the preset result further comprises:
   obtaining a deformation condition of a preset path in the displacement cloud diagram;
   determining whether the deformation condition matches a preset deformation condition in the preset result, wherein, determining that the simulation result matches the preset result if yes, and determining that the simulation result doesn't match the preset result if no.

4. The method of claim 1, wherein the simulation result comprises at least one of a displacement cloud diagram, a stress cloud diagram, and a strain cloud diagram;

the step of determining whether the simulation result matches the preset result further comprises:

obtaining a stress distribution of a preset path in the stress cloud diagram;

determining whether the stress condition matches a preset stress distribution condition in the preset result, wherein, determining that the simulation result matches the preset result if yes, and determining that the simulation result doesn't match the preset result if no.

5. The method of claim 1, wherein the simulation result comprises at least one of a displacement cloud diagram, a stress cloud diagram, and a strain cloud diagram;

the step of determining whether the simulation result matches the preset result further comprises:

obtaining a strain distribution of a preset path in the strain cloud diagram;

determining whether the strain condition matches a preset strain distribution condition in the preset result, wherein, determining that the simulation result matches the preset result if yes, and determining that the simulation result doesn't match the preset result if no.

6. The method of claim 1, wherein the step of adjusting the design parameters according to the simulation result comprises:

adjusting the design parameters corresponding to positions of openings of the non-pixel area of the fine metal mask and/or distribution density of the openings according to at least one of the deformation condition, the stress condition and the strain condition.

7. The method of claim 1, wherein a thickness of the three-dimensional simulation model of the fine metal mask is a product of an initial thickness of the fine metal mask and a preset coefficient; the design parameters comprise the initial thickness, and the preset coefficient is a constant.

8. A design device for a fine metal mask, comprising:

at least one processor, and a memory connected to the at least one processor;

wherein, instructions executable by the at least one processor is stored in the memory, and the at least one processor implements the method of claim 1 by executing the instructions stored in the memory.

9. A computer-readable storage medium, comprising:

computer instructions stored in the computer-readable storage medium, wherein the method of claim 1 is implemented when the computer instructions are executed by at least one processor of a computer device.

10. A design device for a fine metal mask, comprising:

an acquisition module configured to establish a three-dimensional simulation model of the fine metal mask according to design parameters of the fine metal mask, and obtain material property parameters of the fine metal mask, wherein the material property parameters comprises at least one of elasticity modulus, shear modulus and Poisson's ratio;

an operation module configured to perform a simulation operation on the three-dimensional simulation model according to the material property parameters and simulation conditions, in order to obtain a simulation result of the fine metal mask after a mesh stretching, and the simulation conditions are configured to represent constraint conditions of the fine metal mask during the mesh stretching, and the simulation result comprises at least one of a deformation condition, a stress condition and a strain condition of the fine metal mask after the mesh stretching is performed;

a determination module configured to determine whether the simulation result matches a preset result; and an adjustment module configured to adjust the design parameters according to the simulation result if no, and to select the design parameters if yes, wherein the fine metal mask comprises a pixel area and a non-pixel area, and the design parameters comprise a first size of the pixel area and a second size of the non-pixel area, the acquisition module is further configured to:

establish a three-dimensional simulation model of a pixel unit structure according to the first size, wherein at least one of pixel unit structures constitutes the pixel area, and the pixel unit structure is a smallest anisotropic structure in the pixel area;

establish a three-dimensional simulation model of the pixel area according to the three-dimensional simulation model of the pixel unit structure and a shell element modeling method;

establish a three-dimensional simulation model of the non-pixel area according to the second size and the shell element modeling method; and combine the three-dimensional simulation model of the pixel area and the three-dimensional simulation model of the non-pixel area to obtain the three-dimensional simulation model of the fine metal mask.

11. The device of claim 10, wherein the acquisition module is further configured to:

copy the three-dimensional simulation model of the pixel unit structure to obtain a pixel unit group structure with orthogonal anisotropy; and analyze, by using a finite element analysis method, the pixel unit group structure to obtain the material property parameters.

12. The device of claim 10, wherein the simulation result comprises at least one of a displacement cloud diagram, a stress cloud diagram, and a strain cloud diagram, and the determination module is configured to:

obtain a deformation condition of a preset path in the displacement cloud diagram;

determine whether the deformation condition matches a preset deformation condition in the preset result, wherein, determining that the simulation result matches the preset result if yes, and determining that the simulation result doesn't match the preset result if no.

13. The device of claim 10, wherein the simulation result comprises at least one of a displacement cloud diagram, a stress cloud diagram, and a strain cloud diagram, and the determination module is configured to:

obtain a stress distribution of a preset path in the stress cloud diagram;

determine whether the stress condition matches a preset stress distribution condition in the preset result, wherein, determining that the simulation result matches the preset result if yes, and determining that the simulation result doesn't match the preset result if no.

14. The device of claim 10, wherein the simulation result comprises at least one of a displacement cloud diagram, a stress cloud diagram, and a strain cloud diagram, and the determination module is configured to:

obtain a strain distribution of a preset path in the strain cloud diagram;

determine whether the strain condition matches a preset strain distribution condition in the preset result, wherein, determining that the simulation result matches the preset result if yes, and determining that the simulation result doesn't match the preset result if no.

15. The device of claim 10, wherein the adjustment module is configured to:
    adjust the design parameters corresponding to positions of openings of the non-pixel area of the fine metal mask and/or distribution density of the openings according to at least one of the deformation condition, the stress condition and the strain condition.

16. The device of claim 10, wherein a thickness of the three-dimensional simulation model of the fine metal mask is a product of an initial thickness of the fine metal mask and a preset coefficient; the design parameters comprise the initial thickness, and the preset coefficient is a constant.

\* \* \* \* \*